(No Model.) 2 Sheets—Sheet 1.
J. H. STEVENS & M. C. LEFFERTS.
PROCESS OF MANUFACTURING PYROXYLIN SHEETS.
No. 600,824. Patented Mar. 15, 1898.
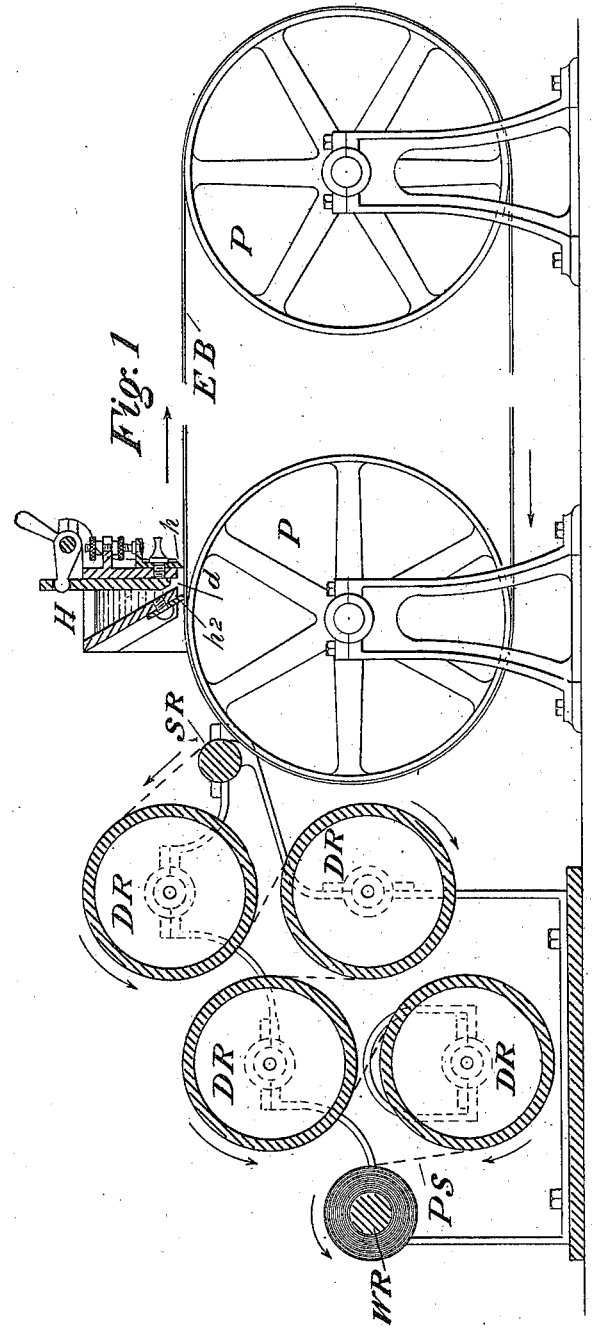
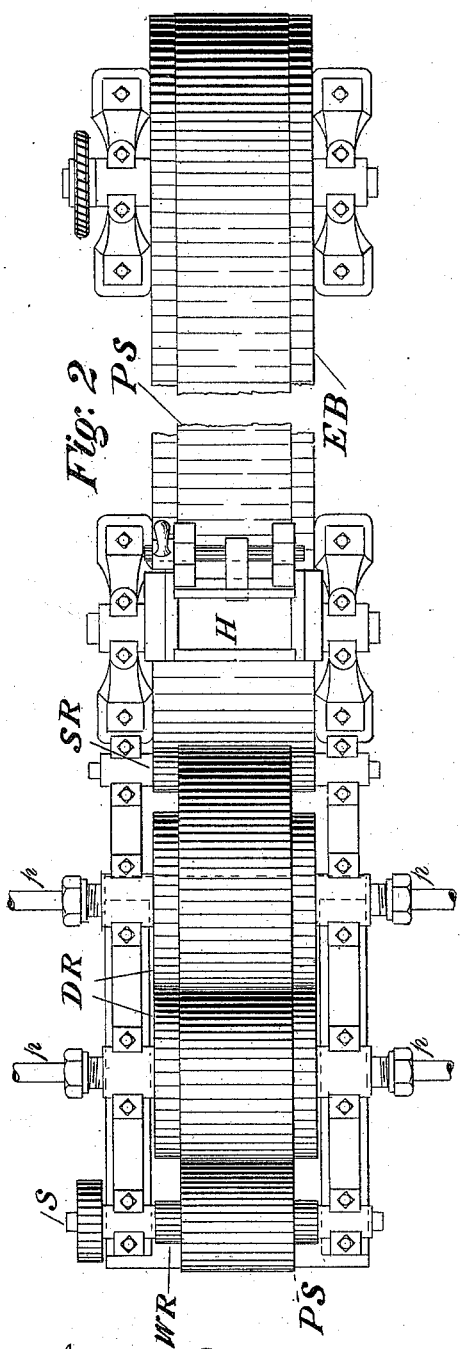
WITNESSES:
INVENTORS
John H. Stevens
Marshall C. Lefferts
BY
ATTORNEY.

(No Model.) 2 Sheets—Sheet 2.
J. H. STEVENS & M. C. LEFFERTS.
PROCESS OF MANUFACTURING PYROXYLIN SHEETS.
No. 600,824. Patented Mar. 15, 1898.
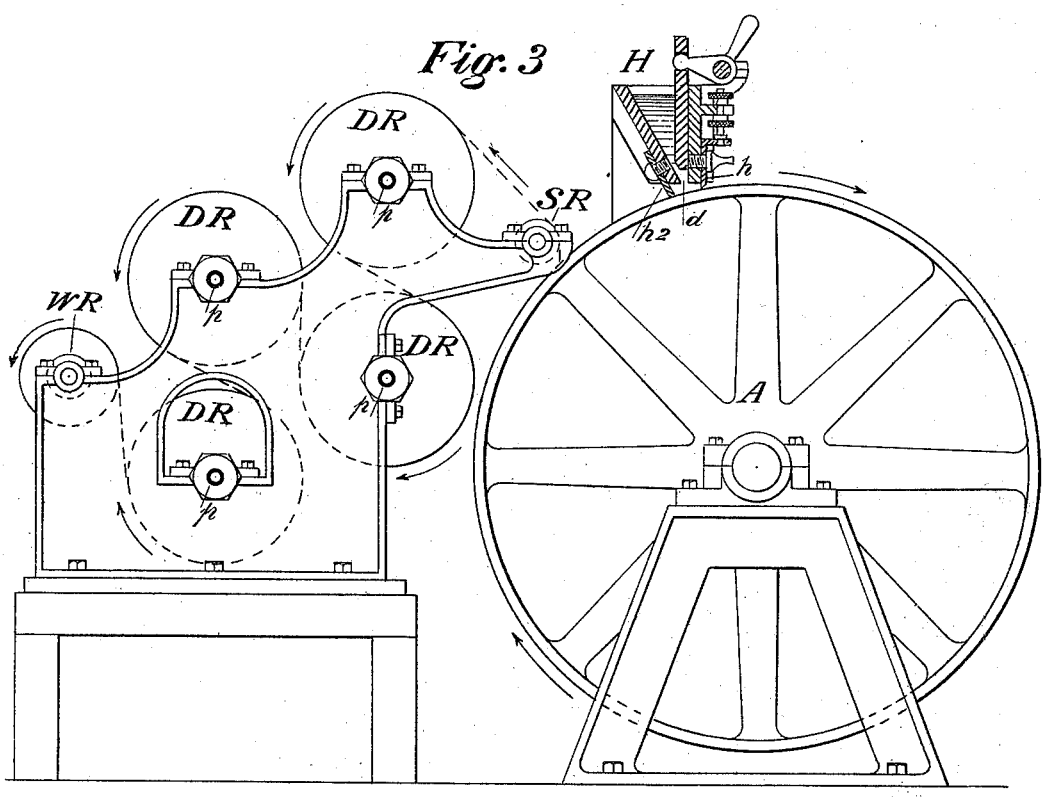
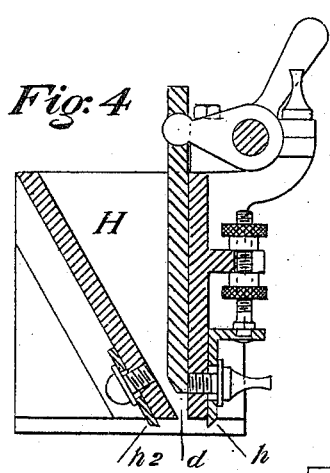
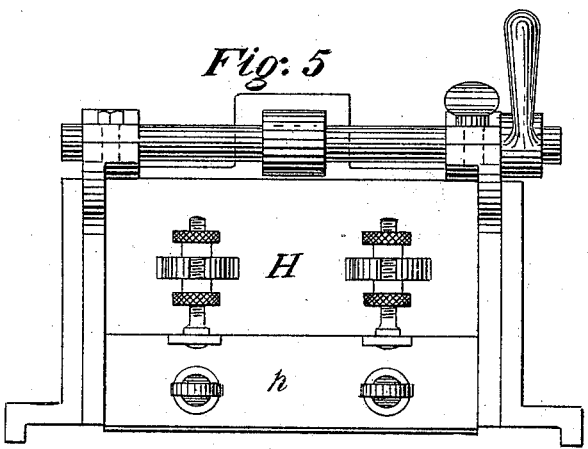
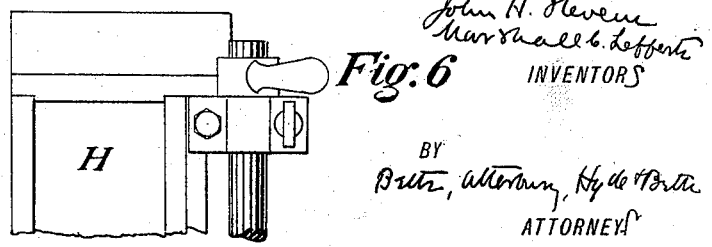

UNITED STATES PATENT OFFICE.

JOHN H. STEVENS, OF NEWARK, NEW JERSEY, AND MARSHALL C. LEFFERTS, OF NEW YORK, N. Y., ASSIGNORS TO THE CELLULOID COMPANY, OF NEW YORK, N. Y., A CORPORATION OF NEW JERSEY.

PROCESS OF MANUFACTURING PYROXYLIN SHEETS.

SPECIFICATION forming part of Letters Patent No. 600,824, dated March 15, 1898.

Application filed July 17, 1891. Serial No. 399,833. (No specimens.)

*To all whom it may concern:*

Be it known that we, JOHN H. STEVENS, residing at Newark, in the county of Essex and State of New Jersey, and MARSHALL C. LEFFERTS, residing at New York city, in the county and State of New York, citizens of the United States, have invented certain new and useful Improvements in the Process of Manufacturing Pyroxylin Sheets, of which the following is a specification.

This invention has for its object the production of long thin sheets or films of pyroxylin material useful for many purposes in the arts, as well as specially applicable to the manufacture of supports for photographic negatives or positives. Heretofore two general methods have been employed in making pyroxylin sheets, in one of which the soluble pyroxylin has been dissolved in suitable solvents to a fluid or semifluid condition and then spread or poured upon a smooth surface of glass and permitted to dry, and afterward stripped from the glass in the form of a thin sheet. According to the other method which has been employed the pyroxylin has been converted into a solid compound by the use of a comparatively small proportion of solvent and by the aid of masticating operations in heated rolls, in which case the stimulating effect of the heat and pressure enabled the employment of so little solvent that the compound from first to last was maintained in a solid condition. This solid compound was molded into a block or other suitable shape and sheets having an unfinished surface cut from it either in a lathe or planing-machine. The sheets cut in a planing-machine were necessarily limited as to their length, and it was necessary in order to give the surface of the sheets a finished appearance to subject them to additional operations before they were ready for the market. This was also true in regard to long sheets cut from a solid block of pyroxylin material in a lathe, with the additional disadvantage that the ordinary methods for finishing sheets of limited superficial area were not applicable to completing very long sheets. It was also necessary before these cut sheets could be properly finished to subject them to some seasoning operation by exposing them for a long time in drying-rooms, all of which, though it furnished generally satisfactory products, was expensive and considerable time elapsed between the making of the original pyroxylin compound and its final delivery to the trade in the condition of finished sheets. In addition to this the production of ornamented surface effects or even an excellent degree of plain finish has been limited to the comparatively short sheets, and the best results obtainable in the long sheets have been simply a dull polished surface.

In the method where thin pyroxylin solutions are spread upon the surface of glass and permitted to dry, which method of late years has been made to yield practical results through the discovery and application of new solvents of pyroxylin, the resultant sheet or film receives a finished surface by copying the smooth surface of the glass on one side and retaining the level surface of the original liquid solution on the other; but the glass surfaces are of limited extent, and the sheets made by the liquid method have necessarily been limited to the size of the glass employed, besides which the spreading of solutions by this latter method has been attended with great loss of solvent from evaporation necessary in order to form the final hardened sheet or film.

In the production of ornamented surface effects the liquid method has been very much inferior to the process of forming finished sheets by the use of the solid compound, chiefly because the plates of glass could not be procured in as great a variety of designs as the plates used in finishing the plain sheets by the solid method; but, as before stated, the production of these effects in long sheets by even the solid method was impossible, and in order to get a seasoned or thoroughly-dried sheet which would practically be free from tendency to warp or shrink the glass and adhering film had to be left exposed to the air for some time in order to remove the final traces of solvent. It will therefore readily be seen that taken in connection with the great expense of glass and the small weight of film which one plate could form the operation of forming sheets by the liquid method even under the best conditions has been so expensive as to prevent such sheets from coming into extensive commercial use; and, again, in the old flowing method glass was used not only on account of the smoothness of its surface, which imparted a similar surface to the pyroxylin compound dried in contact with it, but more especially for the reason that the pyroxylin solution did not corrode or otherwise injure the polished surface of the glass, for although pyroxylin solutions had no corrosive effect on glass they were of such nature that their contact with metal was apt to corrode or oxidize the polished surface of any except some of the noble metals and so ruin the said surface for forming finished pyroxylin sheets. Now by means of our present invention we have practically overcome all of the difficulties above enumerated and are enabled to manufacture extremely long thin sheets of any desired caliber rapidly and cheaply, either plain or ornamented with fancy patterns, without the necessary waste of solvent or time formerly required to season sheets. In fact, we require but a few hours from the time our solution is spread until it is reeled up in a thoroughly dried finished state.

In a series of experiments which led to this invention we have ascertained that by using pyroxylin in which the acids have been thoroughly removed by careful washing or neutralized by means of some mild basic salt or substance (either while the pyroxylin is being washed or even after it has been dissolved) and also by using perfectly neutral solvents the power of corroding or oxidizing the baser metals ordinarily possessed by pyroxylin compounds is destroyed and we are enabled to make a pyroxylin solution which when coated upon a metallic surface and dried and stripped therefrom has exactly the same appearance as though made upon glass, while the surface of the metal remains practically uninjured. We are thus enabled to replace the slow and expensive methods heretofore employed, wherein the pyroxylin material was spread upon glass of limited length, by substituting therefor a metallic surface, by which means we can obtain sheets in quality of finish or polish equal to those made upon glass. One novel feature of this invention is therefore the substitution of a smooth metallic surface for the surface of glass, which has heretofore been used in forming sheets from fluid pyroxylin compounds; and as an additional novelty of this invention we make such surface of metal in the form of an endless belt, upon which the pyroxylin solution is spread and dried while the belt is in motion and then stripped from the belt before it has made a complete revolution, thus furnishing a means for manufacturing uniform sheets with great regularity and rapidity and of practically unlimited length, and the recovery of the evaporated solvents, which has heretofore been practically impossible, is by this means rendered perfectly practicable, because it permits the adoption of mechanism in which the ordinary methods of condensation are employed, all as is hereinafter explained, besides which, by the use of heated drying-rolls in connection with our belt or wheel, we season the sheets while they are held level and true, which constitutes in itself a great improvement both as regards economy in manufacture and quality of goods.

In carrying out this invention an apparatus may be employed substantially as herein specified and as illustrated in the drawings, in which similar letters indicate similar parts throughout the various views.

Figure 1 is a longitudinal sectional view of an apparatus for practicing our process. Fig. 2 is a plan view of the same. Fig. 3 shows a modification. Figs. 4, 5, and 6 show enlarged detail views of hopper H.

E B, Figs. 1 and 2, is an endless belt of metal of such thickness as to be strong, but flexible, and made, preferably, of German silver or nickel-plated copper placed around the pulleys P P, from which it receives its motion. This belt can be of any convenient length and width and can be supported or prevented from sagging by the use of idlers or other well-known means for supporting it between the pulleys P P. No mechanism for imparting motion to the pulleys P P is shown in the drawings. Any suitable mechanical means can be employed to move the pulleys so long as the arrangement permits the rate of speed to be regulated as desired, the rate of speed, as will be understood, depending upon the consistency or drying properties of the pyroxylin solution, length of belt, and other conditions.

In Fig. 3 a modification of the apparatus is shown by passing the endless belt around a large pulley or wheel A or using the surface of such wheel itself.

H, Figs. 1, 2, and 3, is a hopper used for spreading the pyroxylin compound on the belt or wheel, and it has a narrow slit or adjustable opening in its lower side $d$ next the belt or wheel, from which the solution flows. The thickness of the deposit of solution upon the belt or wheel is regulated by a scraper $h$ so constructed that its distance from the belt may be varied. Scraper $h^2$ is composed of rigid material, softer than the surface of the belt or wheel, to avoid abrasion and is in contact with the belt or wheel, so as to prevent the spread of solution in that direction.

Figs. 4, 5, and 6 show enlarged views of hopper H, with adjustable opening $d$ and scrapers $h$ and $h^2$.

S R, Figs. 1, 2, and 3, is a stripping-roll for stripping the pyroxylin sheet from the belt or wheel, from whence it passes over the drying-rolls D R.

D R, Figs. 1, 2, and 3, is a series of rolls of smooth or polished metal, capable of being heated or cooled by suitable steam or water pipe attachments p, Figs. 2 and 3. Cloth or paper covered rolls can be used and furnish excellent means for drying, but revolving rolls or wheels are preferred for drying the film.

W R, Figs. 1, 2, and 3, is a winding-roll upon which the sheet of dry pyroxylin compound can be wound. This winding-roll may consist of a simple spool of wood or other suitable material arranged so that it can be detached from the shaft S, carrying with it the pyroxylin sheet P S wound upon it, thus furnishing a convenient core for the same. Said apparatus forms the subject-matter of another application filed simultaneously herewith, Serial No. 399,832.

Pyroxylin compounds suitable for the formation of sheets by evaporation are too well known to require description. It is sufficient to say that the pyroxylin must be free from acid, as already described, and that the solvents employed should be neutral and of such a nature that the solvent will evaporate as rapidly as possible consistent with the desired quality of the resultant film and will leave the pyroxylin in the form of a smooth sheet of a homogeneous nature. The solubility of the pyroxylin and the employment of the solvents in proper proportions to obtain the right consistency and of suitable volatility and freedom from water, and also the use in the mixture of solid solvents like camphor and colorless ingredients for transparent effects and dyes or pigments or other substances which will modify the character of the dry sheet, are matters well understood by manufacturers of these compounds. The skilled operators in this art are acquainted with the requirements of pyroxylin solvents and the different effects produced in using solvents of varying characteristics.

In operating the apparatus the endless belt E B or the wheel A is set in motion in the direction indicated by the arrows in the drawings, and the hopper H, kept filled with the pyroxylin solution by any suitable means, spreads the solution in a layer of uniform thickness upon the belt or wheel. If a belt is used, it is preferably of such length and travels with only such speed as to permit the solution to part with sufficient of the solvent to become set or too still to flow before it has left the horizontal position and begun to pass over the first pulley to which it comes. The employment of the wheel is limited to cases where the solvents are sufficiently volatile to permit the spread solution to set quickly, so that the absence of horizontal positions will not cause irregularities in the dried sheet by the flowing of the solution or compound. The speed of the belt or wheel and also the flow from the hopper should be so regulated that the sheet will have become sufficiently dry to be stripped and passed over the drying-rolls before it has made a complete revolution with the belt or wheel and before the portion of the belt to which it adheres reaches the hopper.

In regard to the stripping-roll S R we would state that it ought to be of small diameter, preferably about two inches in diameter, of straight face and smooth surface, and to be parallel with the face of the belt or wheel. This stripping-roll performs the very important function of pulling the film from the belt or wheel with an even tension and is preferably placed very close to the belt or wheel, so that the film will be stripped immediately after passing under the stripping-roll, or at the first point of contact therewith, and on a line with the centers of the roll and the nearest pulley or the wheel. This prevents stretching or distorting the film by reason of its tendency to leave the wheel or belt irregularly and not on a line parallel with the face of the wheel or belt. This stripping-roll is preferably arranged so as to revolve with the stripped film. By heating the drying-rolls D R in such a manner that the freshly-stripped sheet is brought successively in contact with rolls of constantly-increasing temperature the residues of volatile solvent are driven off very rapidly and great economy in time is thus effected and the capacity of the driving belt or wheel is also greatly increased, for it has been found that by maintaining a tension upon the sheets while they are in contact with heated rolls the evaporation of the solvent from the compound on the endless belt or wheel need only be carried to a point where the solution will have become set in the condition of a moderately soft sheet, which can then be stripped and passed over the drying-rolls. In all cases it is preferable to attach a sufficient length of cloth to the end of the sheet, so that it can be held taut and led around or held back while passing around the rolls or while being wound upon the spool or winding-roll W R. The last one or more drying-rolls over which the sheet passes are preferably of a lower temperature than the others in order to chill the sheet before it is rolled upon the winding-roll W R. In using cloth-covered rolls the drying may be done in the air at ordinary temperatures or in specially dry or slightly-heated air. Of course it is obvious that by using a very rapid drying solution on a very large wheel or extra long belt moving at a very slow rate of speed a film would be formed sufficiently dry to be used for a great many practical purposes, thus obviating the necessity for drying-rolls; but we do not prefer such a method in view of the excellent results produced by our preferred process. When a polished sheet is required, the metal belt or wheel will also be polished on the side which comes in contact with the sheet, or if the design is not too rough or deep the metal surface can be given any character desired, which will be in turn imparted to the pyroxylin sheet with which it comes in contact. This apparatus can be connected with a suitable condensing apparatus for recovering the evaporated solvents by simply inclosing the endless belt or wheel wholly or partially in or permitting it to pass through a chamber containing chilled surfaces with suitable means for carrying off the condensed solvents. Such chilled surfaces can be produced by freezing mixtures or by the expansion of gases, as is well understood. Suitable means for maintaining an elevated temperature in the film will in such case be preferable, and, in fact, the wheel or belt surface should in all cases be maintained at a tempreature of about 80° Fahrenheit to counteract the chilling effect of evaporating the liquids. This can be done by internal heating or any appropriate means. The temperature, however, must be low enough to prevent blisters forming in the film.

The surface of the belt or wheel may be of any materials other than metal—such as glass or hard rubber, for instance—applied by a suitable means, which are capable of presenting a smooth highly-finished surface, and if the well-known difficulties in applying such surfaces are overcome and the surface be such that acids will not corrode them it will not, of course, be necessary to be so careful in freeing the pyroxylin from acid tendencies; but metal surfaces and carefully-prepared pyroxylin are the best conditions for successful work. It is of course obvious that there is a limit to the thickness of sheets produced by this method and that heavy or thick sheets are practically excluded. Thin or fairly thin sheets are those contemplated, or such sheets as are usually made by evaporating down-flowable pyroxylin solutions on surfaces.

The use of heat to produce fluidity in the solutions or the heating or cooling of any portion of the belt, pulley, or other mechanism employed for the purpose of modifying the evaporation or for other effects may be employed with the process of this patent.

By means of the herein-described process beautiful smooth pyroxylin sheets of a homogeneous nature, uniform in thickness, and of any desired length, and thoroughly seasoned, can be easily and more rapidly produced and with much greater economy than has heretofore been possible with sheets of limited superficial measurement made by evaporating pyroxylin compounds on glass. These sheets can be used for all purposes to which other thin pyroxylin sheets have been heretofore applied, and they are specially applicable to photographic purposes, such as photographic negative-supports when transparent or semitransparent and for photographic positives when suitably combined with pigments.

We are aware that prior to our invention pyroxylin solutions suitable for forming sheets by the evaporation process were known; also, that in the manufacture of paper the pulp has been flowed onto a moving endless wheel or belt, the water in part absorbed and the loose sheet of partly-formed paper stripped from the belt and passed over drying-rolls; also, that a number of plates held in place on a belt have been coated with photographic emulsion flowed from a hopper, and that melted lead has been flowed onto the surface of a moving wheel and afterward stripped therefrom in the form of a sheet; but we are not aware that any one has before the date of our present invention flowed a pyroxylin solution onto the moving surface of a wheel or belt, permitted the solvent to evaporate, so as to form a solid sheet or film, and then stripped the sheet from the wheel and passed it over heated drying-rolls with the results as hereinbefore described.

Simple as our process may appear, and made up, as it is, of a new arrangement of old combinations or principles, it is obvious that by means of such new arrangement and the particular bringing together of the various simple principles into new relations we have accomplished a result heretofore unobtained though long desired of great practical usefulness and an important improvement in the art to which it appertains.

The experienced operator will recognize the amount of study and experimenting required before we could demonstrate the practicability of our present method and will appreciate how, in spite of the difficulties usually met with between the first spreading of the pyroxylin solution and its final formation into a level sheet, we have succeeded in producing a long pyroxylin film of any desired surface, free from bubbles or wrinkles, of a uniform thickness, in a thoroughly-seasoned condition, and at a low cost.

What we claim, and desire to secure by Letters Patent, is—

1. The process of manufacturing sheets or strips of pyroxylin compound, which consists in flowing a solution of the compound in the form of a moving, continuous fluid sheet, the thickness of which is regulated by removing the surplus solution, and then evaporating the volatile ingredients from the sheet, substantially as and for the purpose described.

2. The process of manufacturing sheets or strips of pyroxylin compound which consists in making a non-oxidizing solution of the compound containing no free acids, flowing said solution in the form of a moving, continuous, non-oxidizing fluid sheet, the thickness of which is regulated by removing the surplus solution and then evaporating the volatile ingredients from the sheet, substantially as and for the purpose described.

In testimony whereof we affix our signatures, in presence of two witnesses, this 7th day of July, 1891.

JOHN H. STEVENS.
MARSHALL C. LEFFERTS.

Witnesses as to John H. Stevens:
JENNIE A. SMITH,
TIMOTHY E. SCALES.

Witnesses as to Marshall C. Lefferts:
J. E. HINDON HYDE,
H. V. N. PHILIP.